(12) United States Patent
Kouno (10) Patent No.: US 7,640,958 B2
(45) Date of Patent: Jan. 5, 2010

(54) PNEUMATIC TIRE (75) Inventor: Yoshihide Kouno, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 366 days.

(21) Appl. No.: 11/631,418

(22) PCT Filed: Mar. 3, 2005

(86) PCT No.: PCT/JP2005/003647

§ 371 (c)(1),
(2), (4) Date: Jan. 3, 2007

(87) PCT Pub. No.: WO2006/003742

PCT Pub. Date: Jan. 12, 2006

(65) Prior Publication Data

US 2008/0302459 A1    Dec. 11, 2008

(30) Foreign Application Priority Data

Jun. 30, 2004    (JP) .............................. 2004-194030

(51) Int. Cl.
*B60C 15/00* (2006.01)
*B60C 15/06* (2006.01)

(52) U.S. Cl. ................... 152/539; 152/546; 152/552; 152/554; 152/555

(58) Field of Classification Search ................ None
See application file for complete search history.

(56) References Cited

U.S. PATENT DOCUMENTS 6,923,234 B2 *   8/2005   Bestgen et al. .............. 152/543

FOREIGN PATENT DOCUMENTS

| JP | 59-145607 | * | 8/1984 |
|----|-----------|---|--------|
| JP | 62-251202 A | | 11/1987 |
| JP | 64-067405 A | | 3/1989 |
| JP | 04372403 | * | 12/1992 |
| JP | 6-247103 A | | 9/1994 |
| JP | 10-250321 A | | 9/1998 |
| JP | 2001-047820 A | | 2/2001 |
| JP | 2002-079813 A | | 3/2002 |
| JP | 2002-536225 A | | 10/2002 |
| JP | 2003-231405 A | | 8/2003 |
| JP | 2003-237322 A | | 8/2003 |
| WO | WO 00/46047 A1 | | 8/2000 |
| WO | WO 02/096675 | * | 12/2002 |

* cited by examiner

*Primary Examiner*—Justin Fischer
(74) *Attorney, Agent, or Firm*—Sughrue Mion, PLLC (57) ABSTRACT

A pneumatic tire (10) according to the present invention includes a first side reinforcement layer (110) and a second side reinforcement layer (120). The first side reinforcement layer (110) has a plurality of reinforcement cords (110*s*), and the second side reinforcement layer (120) has a plurality of reinforcement cords (120*s*) each crossing the reinforcement cords (110*s*). Additionally, an inclination angle of each of the reinforcement cords (110*s*) and the reinforcement cords (120*s*) with respect to a circumferential line extending in a circumferential direction of the pneumatic tire (10) is 5 to 30 degrees. According to the pneumatic tire (10), high speed durability thereof can be further enhanced without reducing wear life of a shoulder portion thereof.

19 Claims, 5 Drawing Sheets

FIG. 5

US 7,640,958 B2

PNEUMATIC TIRE

TECHNICAL FIELD

The present invention relates to a pneumatic tire whose durability at the time of high-speed rotation is enhanced.

BACKGROUND ART

As a traveling speed of a vehicle has been becoming higher, durability of a pneumatic tire, which is mounted on the vehicle, and which is rotated at a high speed (hereinafter, high speed durability), has become more important than ever.

As to methods of enhancing high speed durability of a pneumatic tire, various proposals have so far been made (such as Japanese Unexamined Patent Application Publication Nos. Sho 62-251202, Hei 6-247103 and 2003-231405).

For example, in Japanese Unexamined Patent Application Publication No. Sho 62-251202, proposed is a method in which a ribbon-shaped layer member formed of cords made of polyamide-based organic fibers is provided all over the entire circumference of a shoulder portion of a pneumatic tire.

According to such a method, even in a case where a large centrifugal force occurs as the pneumatic tire is rotated at a high speed, a tread portion and the like of the pneumatic tire are restrained from expanding outward in a tire radial direction. For this reason, high speed durability of the pneumatic tire is enhanced.

That is, generally, by increasing the number of layers each configured of a layer member provided to a shoulder portion is increased, the high speed durability itself can be further enhanced.

On the other hand, in order to make a shape of the tread portion contacting with a road surface which is the same as that of a carcass line, it is necessary to keep a cross-sectional shape, in a tread width direction, of an outer surface of the tread portion contacting with a road surface to be the same as that of the carcass line. That is, there is the following problem. When the number of layers each configured of the layer member provided to a shoulder portion is increased, a tread gauge (the thickness of a tread rubber) of the shoulder portion becomes thinner than that of a center portion, and a wear life of the shoulder portion is reduced.

The present invention was made in consideration of such a problem, and aims to provide a pneumatic tire whose high speed durability is further enhanced without reducing a wear life of a shoulder portion thereof.

DISCLOSURE OF THE INVENTION

In order to solve the above described problem, the present invention has the following characteristics. First of all, a first characteristic of the present invention is a pneumatic tire (a pneumatic tire 10) having a side reinforcement layer (a side reinforcement layer 100) provided in a side portion (side portion 26) thereof. The first characteristic is as follows. The side reinforcement layer includes a first side reinforcement layer (a first side reinforcement layer 110) and a second side reinforcement layer (a second side reinforcement layer 120). The second side reinforcement layer includes an overlapping region (an overlapping region OL), and is provided outside the first side reinforcement layer in a tread width direction. The overlapping region overlaps the first side reinforcement layer in at least a part of a maximum-width portion (a portion, which extends outward in a tire radial direction by 10% of a carcass height H from a tire maximum-width position P, and which extends inward in the tire radial direction by 10% of the carcass height H from the tire maximum-width position P) of the pneumatic tire in the tread width direction. The first side reinforcement layer includes a plurality of first linear members (reinforcement cords 110s), and the second side reinforcement layer includes a plurality of second linear members (reinforcement cords 120s) each crossing the first linear members. An inclination angle (an inclination angle θ) of each of the first and second linear members with respect to a circumferential line (a circumferential line L), which extends in a circumferential direction of the pneumatic tire, is 5 to 30 degrees.

According to such a characteristic, since the side reinforcement layer composed of the first side reinforcement layer and the second side reinforcement layer is provided to the side portion, circumferential rigidity of the pneumatic tire is effectively enhanced. For this reason, a tread portion and the like of the pneumatic tire are restrained from expanding outward in the tire radial direction, and this makes it possible to enhance high speed durability of the pneumatic tire.

Furthermore, since the reinforcement layer is provided not to a tread portion side but to the side portion, the thinning of a tread gauge of a shoulder portion as compared with that of a center portion can be avoided. That is, according to such a characteristic, a pneumatic tire whose high speed durability is further enhanced without reducing a wear life of the shoulder portion can be provided.

A second characteristic of the present invention is the pneumatic tire according to the first characteristic of the present invention. The second characteristic is that the inclination angle is 5 to 20 degrees.

A third characteristic of the present invention is the pneumatic tire according to any one of the first and second characteristics of the present invention. The third characteristic is that an overlapping width (an overlapping width B) which is a width of the overlapping region in the tire radial direction is equal to 10 to 50% of the carcass height H which is a height from a corresponding bead portion (a bead portion 23) of the pneumatic tire to an end of a carcass layer (a carcass layer 22) on the side of the tread portion (tread portion 21) of the pneumatic tire.

A fourth characteristic of the present invention is the pneumatic tire according to the third characteristic of the present invention, and the fourth characteristic is that the overlapping width is equal to 10 to 30% of the carcass height.

A fifth characteristic of the present invention is the pneumatic tire according to any one of the first to fourth characteristics of the present invention. The fifth characteristic is that a folded-back end portion (a folded-back end portion 22e) of the carcass layer of the pneumatic tire has a length which does not cause the folded-back end portion to overlap an inner end portion (a lower end portion 120b) of the second side reinforcement layer in the tire radial direction, the folded-back end portion being formed by folding back the carcass layer around a bead portion.

A sixth characteristic of the present invention is the pneumatic tire according to any one of the first to fifth characteristics of the present invention. The sixth characteristic is that, in the tire radial direction, a position of the folded-back end portion (the folded-back end portion 22e) of the carcass layer of the pneumatic tire is different from those of an inner end portion of the first and the inner end portion of the second reinforcement layers (the lower end portions 110b and 120b) in the tire radial direction, respectively, the folded-back end portion being formed by folding back the carcass layer around the bead portion of the pneumatic tire.

A seventh characteristic of the present invention is the pneumatic tire according to any one of the first to sixth characteristics of the present invention. The seventh characteristic is that an outer end portion intersection angle (α) is at least 3 degrees larger than an inner end portion intersection angle β. The outer end portion intersection angle (α) is an intersection angle on an outer side in the tire radial direction, which is formed by each of the first linear members and each of the second linear members in an outer end portion (a radially outer end portion Et) of the overlapping region in the tire radial direction. The inner end portion intersection angle (β) is an intersection angle on an inner side in the tire radial direction, which is formed by each of the first linear members and each of the second linear members in an inner end portion (a radially inner end portion Eb) of the overlapping region in the tire radial direction.

An eighth characteristic of the present invention is the pneumatic tire according to any one of the first to seventh characteristics of the present invention. The eighth characteristic is that an inner end portion arrangement distance (d2) is larger than an outer end portion arrangement distance (d1). The inner end portion arrangement distance (d2) is an arrangement distance in the tread width direction between each of the first linear members and each of the second linear members, in the end portion (the radially inner end portion Eb) of the overlapping region on the inner side in the tire radial direction. The outer end portion arrangement distance (d1) is an arrangement distance in the tread width direction between the first linear members and the second linear members in an end portion (the radially outer end portion Et) of the overlapping region on the outer side in the tire radial direction.

A ninth characteristic of the present invention is the pneumatic tire according to the eighth characteristic of the present invention. The ninth characteristic is that the inner end portion arrangement distance (d2) is larger than the outer end portion arrangement distance (d1) by 0.1 to 1 mm.

A tenth characteristic of the present invention is the pneumatic tire according to any one of the first to ninth characteristics of the present invention. The tenth characteristic is that the overlapping width which is the width of the overlapping region in the tire radial direction is not more than 80 mm.

An eleventh characteristic of the present invention is the pneumatic tire according to any one of the first to tenth characteristics of the present invention. The eleventh characteristic is that the first linear members or the second linear members are formed of steel monofilaments or steel cords.

A twelfth characteristic of the present invention is the pneumatic tire according to any one of the first to eleventh characteristics of the present invention. The twelfth characteristic is that the first linear members or the second linear members are formed of predetermined highly elastic organic fiber cords.

BEST MODE FOR CARRYING OUT THE INVENTION (Composition of Pneumatic Tire according to the Present Embodiment)

Next, a pneumatic tire according to an embodiment of the present invention will be described with reference to the drawings. Note that, in the following explanations on the drawings, the same and similar reference numerals are given to the same and similar elements. However, the drawings are schematic, and it should be noted that a ratio and the like of each of dimensions are not to scale.

For this reason, specific sizes and the like should be judged in consideration of the following descriptions. Additionally, it goes without saying that, also between the drawings, there are contained parts between which dimensional relation and ratio are different.

Figure 1:
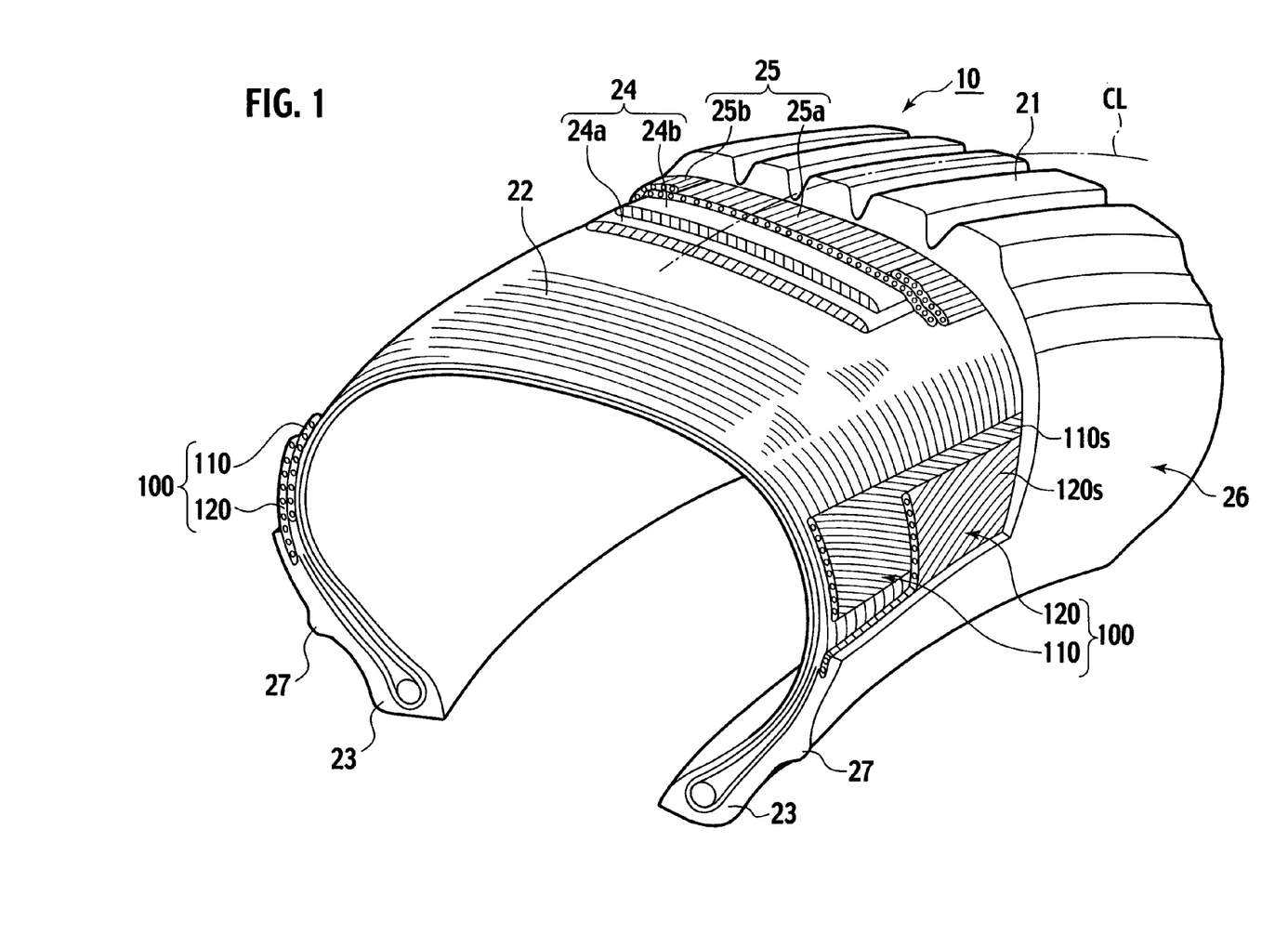
FIG. 1 is a partially disassembled perspective view of a pneumatic tire according to an embodiment of the present invention.

FIG. 1 is a partially disassembled perspective view of a pneumatic tire 10 according to the present embodiment. As shown in FIG. 1, the pneumatic tire 10 includes a carcass layer 22 which forms a skeletal structure of the pneumatic tire 10.

The carcass layer 22 is supported by a pair of bead portions 23 abutting a rim wheel (not illustrated). Additionally, to outer sides of the respective bead portions 23 in a tire radial direction, rim guards 27 which protect corresponding rim flange portions of the rim wheel (not illustrated) are provided respectively.

To the outer side of the carcass layer 22 in the tire radial direction, a crossing belt layer 24 composed of a first belt layer 24a and a second belt layer 24b, which are formed by rubberizing steel cords, is provided. The steel cords composing the first belt layer 24a and the second belt layer 24b are arranged in a manner that each of the steel cords has a predetermined angle (±28 degrees in the present embodiment) with respect to a tire equator line CL.

To the outer side of the crossing belt layer 24 in the tire radial direction, a cap-and-layer layer 25 composed of a cap layer 25a and cap layers 25b is provided.

The cap layer 25a is located on the outer side of the crossing belt layer 24 in the tire radial direction, and is formed by rubberizing organic fiber cords (nylon cords in the present embodiment) aligned substantially in parallel to the tire equator line CL. The cap layer 25a has a width not less than the entire width of the crossing belt layer 24, and reinforces the crossing belt layer 24.

The cap layers 25b are also located on the outer side of the crossing belt layer 24 in the tire radial direction, are also formed by rubberizing organic fiber cords (nylon cords in the present embodiment) aligned substantially in parallel to the tire equator line CL, and are arranged in a manner that the cap layers 25b cover both end portions of the crossing belt layer 24, respectively.

To the outer side of the cap-and-layer layer 25 in the tire radial direction, a tread portion 21 which makes contact with a road surface is provided.

Side reinforcement layers 100 are provided respectively to side portions 26 of the pneumatic tire 10. The side reinforcement layers 100 are provided for the purpose of enhancing durability in a case where the pneumatic tire 10 is rotated at a high speed (high speed durability), which is specifically rigidity in a circumferential direction of the pneumatic tire.

Each of the side reinforcement layers 100 includes a first side reinforcement layer 110 and a second side reinforcement layer 120. In the present embodiment, each of the first side reinforcement layers 110 is located outside the carcass layer 22 in the tread width direction, and abuts the carcass layer 22.

Each of the second side reinforcement layers 120 has an overlapping region OL, which overlaps the corresponding first side reinforcement later 110 in a tire maximum-width position P (refer to FIG. 2), and is provided more outside the carcass layer 22 in the tread width direction than the first side reinforcement layer 110.

Additionally, each of the first side reinforcement layer 110 is formed by rubberizing a plurality of reinforcement cords 110s (first linear members). Each of the second side reinforcement layer 120 is formed by rubberizing a plurality of reinforcement cords 120s (second linear members) crossing the reinforcement cords 110s.

In the present embodiment, the reinforcement cords 110s and the reinforcement cords 120s are formed of steel cords. Note that, the reinforcement cords 110s or the reinforcement cords 120s may be formed of steel monofilaments. Otherwise, the reinforcement cords 110s or the reinforcement cords 120s may be formed of predetermined highly elastic organic fiber cords such as Kevlar, carbon fiber or polyketone.

Figure 2:
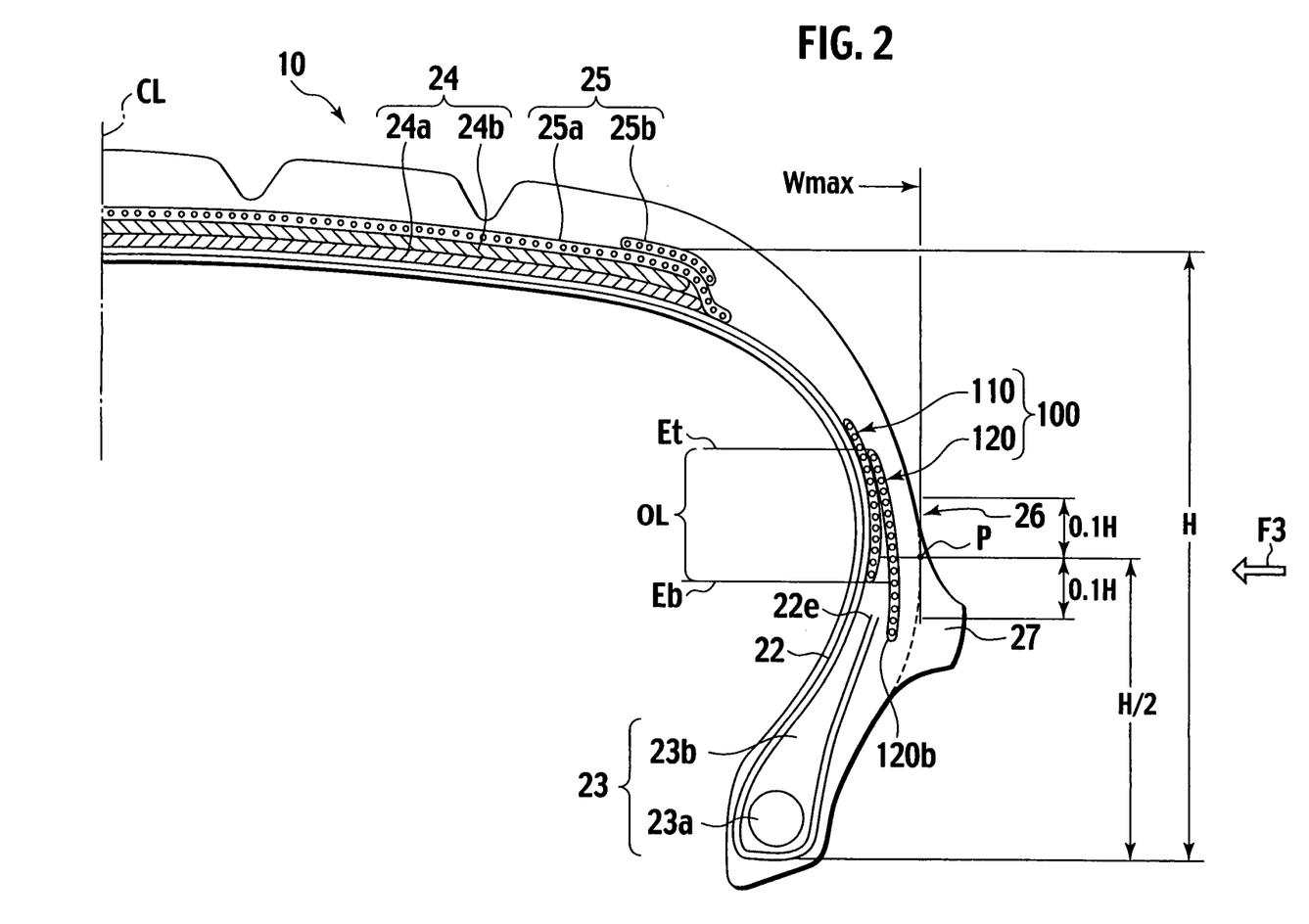
FIG. 2 is a partial cross-sectional view of the pneumatic tire according to the embodiment of the present invention.

FIG. 2 is a partial cross-sectional view of the pneumatic tire 10 in the tread width direction. As has been described above, the side reinforcement layers 100 are provided respectively to the side portions 26 of the pneumatic tire 10.

Specifically, each of the side reinforcement layers 100 is provided to a "tire maximum-width portion" on the corresponding side portion 26. Here, the tire maximum-width portion is a portion, which extends outward in the tire radial direction from a tire maximum-width position P by 10% of the height H of the carcass, and which extends inward in the tire radial direction from the tire maximum-width position P by 10% of the height H of the carcass. The tire maximum-width position P is a position corresponding to the maximum-width Wmax of the pneumatic tire 10. Note that the rim guards 27 protruding in the tread width direction are not included in the tire maximum-width Wmax.

Additionally, as has been described above, each of the second side reinforcement layers 120 has the overlapping region OL which overlaps corresponding one of the first reinforcement layers 110 in at least a part of the tire maximum-width portion.

It is preferable that an overlapping width B (refer to FIG. 3) which is a width of the overlapping region OL in the tire radial direction be equal to 10 to 50% of the carcass height H which is a height from the bead portion 23 to an end of the carcass layer 22 in a tread portion side thereof.

Figure 3:
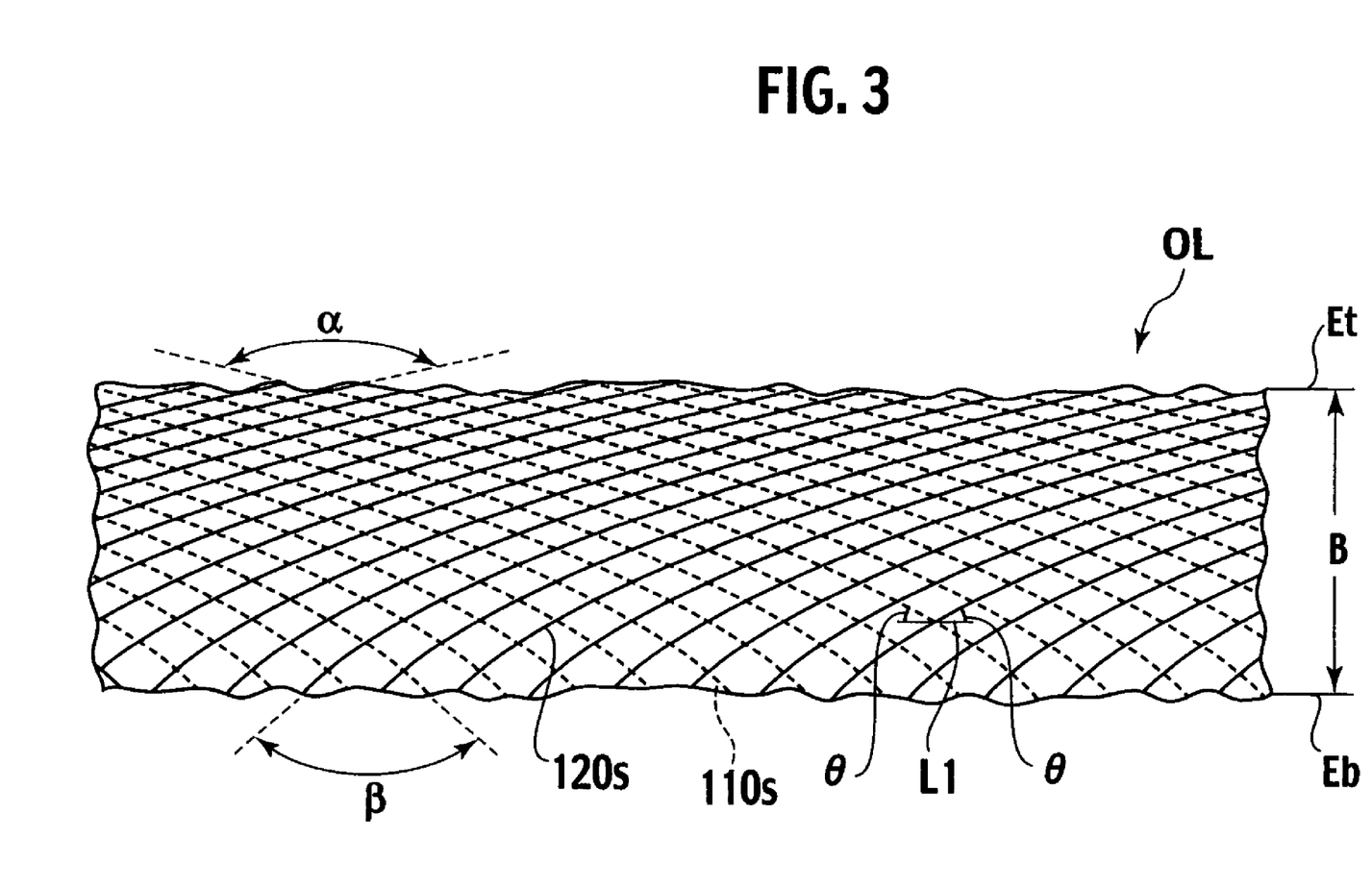
FIG. 3 is a view of an overlapping region as viewed in a direction indicated by an arrow F3 in FIG. 2.

Note that, from the viewpoint of further restraining interlaminar shear strain occurring between the first side reinforcement layer 110 and the second side reinforcement layer 120, or between the carcass layer 22 and the first side reinforcement layer 110, it is more preferable that the overlapping width B be equal to 10 to 30% of the carcass height H.

In the present embodiment, folded-back end portions 22e of the carcass layer 22, which are formed by folding back the carcass layer 22 respectively around the bead portions 23 (each including a bead core 23a and a bead filler 23b), are located more inside in the tire radial direction than end portions in the tire radial direction of the respective side reinforcement layers 100, the end portions being specifically lower end portions 120b of the respective second side reinforcement layers 120.

(Detailed Configuration of Overlapping Region)

Next, a detailed configuration of the overlapping region OL will be described. FIG. 3 is a view of the overlapping region OL as viewed the overlapping region OL in a direction indicated by an arrow F3 in FIG. 2.

As shown in FIG. 3, an inclination angle θ of the reinforcement cords 110s (the first linear members) and the reinforcement cords 120s (the second linear members) with respect to a circumferential line L extending along the circumferential direction of the pneumatic tire 10 is set at 5 to 30 degrees.

Note that it is preferable, from the viewpoint of effectively further enhancing the circumferential rigidity of the pneumatic tire 10, that the inclination angle θ be 5 to 20 degrees.

Here, in a radially outer end portion Et which is an end portion of the overlapping region OL on the outer side in the tire radial direction, an intersection angle formed by each of the first linear members and each of the second linear members on the outer side in the tire radial direction is represented as an outer end portion intersection angle α. Additionally, in a radially inner end portion Eb which is an end portion of the overlapping region on the inner side in the tire radial direction, an intersection angle formed by each of the first linear members and each of the second linear members on the inner side in the tire radial direction is represented as an inner end portion intersection angle β.

It is preferable that the outer end portion intersection angle α be set at not less than 3 degrees larger than the inner end portion intersection angle β.

Additionally, it is preferable that the overlapping width B which is a width of the overlapping region in the tire radial direction be set at not more than 80 mm. Note that it is more preferable, from the viewpoint of further restraining interlaminar shear strain at the same time as enhancing the circumferential rigidity by the side reinforcement layers 100 (the first reinforcement layers 110 and the second reinforcement layers 120), that the overlapping width B be not more than 50 mm.

Note that, as a method of composing the side reinforcement layer 100 in which the outer end portion intersection angle α and the inner end portion intersection angle β are different from each other, the reinforcement cords 110s are curved in a predetermined direction by slightly twisting upper and lower ends of the first side reinforcement layer 110 (a rubberized layer) in which the reinforcement cords 110s are aligned at a substantially equal interval.

Likewise, by slightly twisting upper and lower ends of the second side reinforcement layer 120 (a rubberized layer) in which the reinforcement cords 120s are aligned at a substantially equal interval, the reinforcement cords 120s are curved in a direction opposite to the direction in which the reinforcement cords 110s are curved. By such a method as this, the side reinforcement layer 100 shown in FIG. 3 can be composed.

Figure 4:
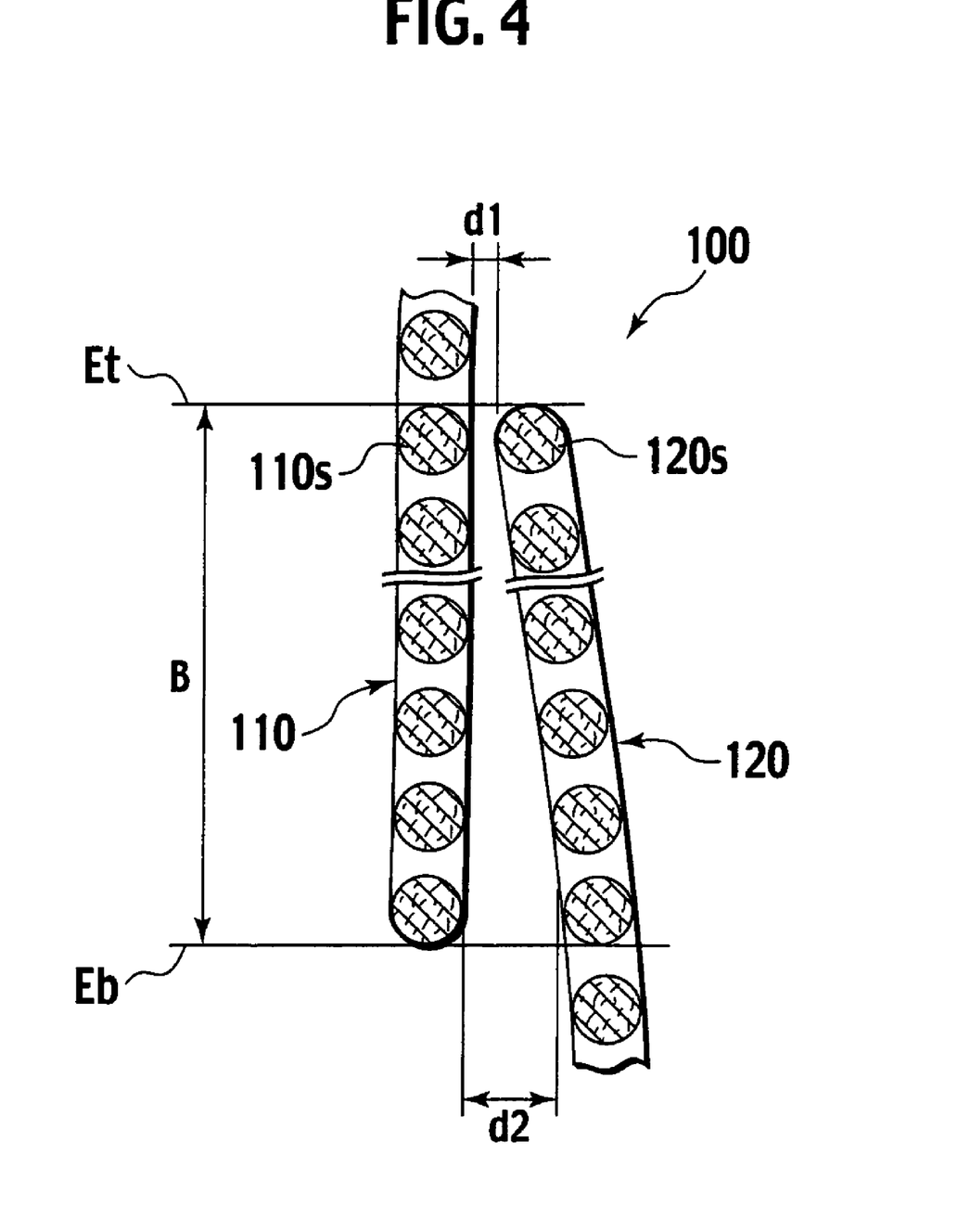
FIG. 4 is a partially enlarged view in a cross section of side reinforcement layers in a widthwise-direction of a tread of the tire according to the embodiment of the present invention.

FIG. 4 is a partially enlarged view of the side reinforcement layer 100 in a cross section in the tread width direction. As shown in FIG. 4, an arrangement distance in the tread width direction from the reinforcement cords 110s to the reinforcement cords 120s in the radially inner end portion Eb is represented as an inner end portion arrangement distance d2. Additionally, an arrangement distance in the tread width direction from the reinforcement cords 110s to the reinforcement cords 120s in the radially outer end portion Et is represented as an outer end portion arrangement distance d1.

It is preferable that the inner end portion arrangement distance d2 be set larger than the outer end portion arrangement distance d1 (d2>d1). Note that it is more preferable, from the perspective of restraining interlaminar shear strain, which occurs between each of the first side reinforcement layers 110 and each of the second side reinforcement layers 120, and a temperature increase in the side portions 26, the inner end portion arrangement distance d2 be larger by a range of 0.1 to 1 mm than the outer end portion arrangement distance d1.

(Comparative Assessment)

Next, a description will be given of comparative assessment results with respect to pneumatic tires (hereinafter, Examples) according to the present embodiment, and pneumatic tires (hereinafter, Comparative Examples) prepared so as to be compared with the pneumatic tires according to Examples.

(1) Compositions of Pneumatic Tires Used for Comparative Assessment

Compositions of the pneumatic tires according to Examples and Comparative Examples used for the comparative assessment have the following parts in common with one another:

- a tire size of 215/45R17;
- a belt layer composition composed of a first belt layer, a second belt layer and a cap-and-layer layer;
- a first belt layer composition having a steel cord formed as 1 (cord)*5 (number of twists)*0.225 mm (a filament diameter), a number of embedded cords being 36 cords/50 mm, a steel cord arrangement direction being inclined by +28 degrees (in a right direction in a tread plan view) with respect to a tire equator line, and a width being 170 mm;
- a second belt layer composition having steel cords each formed as 1 (cord)*5 (number of twists)*0.225 mm (a filament diameter), a number of embedded cords being 36 cords/50 mm, a steel cord arrangement direction being inclined by −28 degrees (in a left direction in the tread plan view) with respect to a tire equator line, and a width being 150 mm;
- a cap layer composition having a number of layers being 1, nylon cords each being 1260 d/2, a number of embedded cords being 50 cords/50 mm, and a width being 180 mm;
- a cap layer composition having a number of layers being 1, nylon cords each being 1260d/2, and a width being 30 mm; and
- a carcass layer composition having PET cords each being 1500d/2, and a number of embedded cords being 50 cords/50 mm.

Additionally, Table 1 shows: compositions of the side reinforcement layers provided to the pneumatic tires according to Example and Comparative Example used for comparative assessments; and results of a comparative assessment test.

TABLE 1

| | LINEAR MEMBER TYPE OF SIDE REINFORCEMENT LAYER | INCLINATION ANGLE (θ) | AVERAGE INTERSECTING ANGLE | OVERLAPPING RATIO | OVERLAPPING WIDTH (B) | NUMBER OF EMBEDDED CORDS (CORDS/50 mm) | α − β | d1 | d2 | DURABILITY LEVEL |
|---|---|---|---|---|---|---|---|---|---|---|
| COMPARATIVE EXAMPLE 1 | STEEL CORD (1*5*0.225 mm) | 0° | 0° | 20% | 16 mm | 36 | 3° | 0.5 mm | 0.6 mm | 226 km/h*[1] |
| EXAMPLE 1 | STEEL CORD (1*5*0.225 mm) | 5° | 10° | 20% | 16 mm | 36 | 3° | 0.5 mm | 0.6 mm | 266 km/h |
| EXAMPLE 2 | STEEL CORD (1*5*0.225 mm) | 10° | 20° | 20% | 16 mm | 36 | 3° | 0.5 mm | 0.6 mm | 266 km/h |
| EXAMPLE 3 | STEEL CORD (1*5*0.225 mm) | 20° | 40° | 5% | 16 mm | 36 | 3° | 0.5 mm | 0.6 mm | 258 km/h |
| EXAMPLE 4 | STEEL CORD (1*5*0.225 mm) | 30° | 60° | 5% | 16 mm | 36 | 3° | 0.5 mm | 0.6 mm | 250 km/h |
| COMPARATIVE EXAMPLE 2 | STEEL CORD (1*5*0.225 mm) | 40° | 80° | 5% | 16 mm | 36 | 3° | 0.5 mm | 0.6 mm | 218 km/h |
| EXAMPLE 5 | STEEL CORD (1*5*0.225 mm) | 10° | 20° | 5% | 4 mm | 36 | 3° | 0.5 mm | 0.6 mm | 250 km/h |
| EXAMPLE 6 | STEEL CORD (1*5*0.225 mm) | 10° | 20° | 10% | 16 mm | 36 | 3° | 0.5 mm | 0.6 mm | 266 km/h |
| EXAMPLE 7 | STEEL CORD (1*5*0.225 mm) | 10° | 20° | 30% | 24 mm | 36 | 3° | 0.5 mm | 0.6 mm | 266 km/h |
| EXAMPLE 8 | STEEL CORD (1*5*0.225 mm) | 10° | 20° | 50% | 40 mm | 36 | 3° | 0.5 mm | 0.6 mm | 258 km/h |
| EXAMPLE 9 | STEEL CORD (1*5*0.225 mm) | 10° | 20° | 60% | 48 mm | 36 | 3° | 0.5 mm | 0.6 mm | 250 km/h |
| EXAMPLE 10 | STEEL CORD (1*5*0.225 mm) | 10° | 20° | 30% | 24 mm | 36 | 3° | 0.5 mm | 0.6 mm | 250 km/h*[2] |
| EXAMPLE 11 | STEEL CORD (1*5*0.225 mm) | 10° | 20° | 30% | 24 mm | 36 | 3° | 0.5 mm | 0.5 mm | 250 km/h |
| EXAMPLE 12 | STEEL CORD (1*5*0.225 mm) | 10° | 20° | 30% | 24 mm | 36 | 3° | 0.5 mm | 2.0 mm | 234 km/h |
| EXAMPLE 13 | STEEL FILAMENT (φ0.21 mm) | 10° | 20° | 30% | 24 mm | 90 | 3° | 0.5 mm | 0.7 mm | 266 km/h |
| EXAMPLE 14 | KEVLAR CORD (1500 d/2) | 10° | 20° | 30% | 24 mm | 40 | 3° | 0.5 mm | 0.7 mm | 258 km/h |

*[1]CODE BREAKING UP OCCURRED IN THE CARCASS LAYER.
*[2]SEPARATION OCCURRED IN THE RADIALLY INWARD END SECTION OF THE OVERLAPPING REGION(OL).
Note that "1*5*0.225 mm" shown in "Linear member type of side reinforcement layer" represents 1 (cord)*5 (number of twists)*0.225 mm (a filament diameter) as in the cases with the above described first and second belt layers.

(2) Method of Comparative Assessment Test

The comparative assessment test was carried out with respect to the pneumatic tires shown in Table 1 by setting test conditions as follows:

a set internal pressure of 220 kPa; and a load of 4.7 kN.

Each of the pneumatic tires set under the above described test conditions was rotated for 120 minutes at a speed of 81 km/h by using a drum testing machine having a diameter of 1.7 m. Thereafter, each of the pneumatic tires was left to stand for 3 hours at an ambient temperature of 38° C.

Subsequently, each of the pneumatic tires was rotated sequentially at speeds and time periods shown in Table 2, and the each pneumatic tire was rotated until a failure occurred in the pneumatic tire.

TABLE 2

| SPEED (km/h) | TIME PERIOD (MINUTES) |
| --- | --- |
| 121 | 30 |
| 130 | 30 |
| 140 | 30 |
| 145 | 30 |
| 153 | 30 |
| 161 | 30 |
| 169 | 30 |
| 177 | 30 |
| 185 | 30 |
| 194 | 30 |
| 202 | 30 |
| 210 | 30 |
| 218 | 30 |
| 226 | 30 |
| 234 | 30 |
| 242 | 30 |
| 250 | 30 |
| 258 | 30 |
| 266 | 30 |
| 274 | 30 |

(3) Results of Comparative Assessment Test

In a column for "durability level" in Table 1, speeds at which failures occurred respectively in the pneumatic tires subjected to the comparative assessment test. The failures of the pneumatic tires according to Examples and Comparative Examples were: so-called chunkout in which rubber forming a shoulder portion is torn off; cord breaking up (CBU) in the carcass layer 22; and separation which occurred in the radially inner end portion Eb.

As shown in Table 1, the pneumatic tires according to Comparative Examples had failures at speeds in a range of 218 to 226 km/h. On the other hand, the pneumatic tires according to Examples did not have failures until a speed of 234 km/h was reached. Furthermore, the pneumatic tires according to Examples 1, 2, 6, 7 and 13 did not have failures until a speed of 266 km/h was reached.

Here, when considering causes to which the occurrence of separation of the side reinforcement layer 100 is attributed, interlaminar shear strain in the radially inner end portion Eb can be pointed out first, as described above. In order to restrain the occurrence of interlaminar shear strain, increasing an interlayer gauge is simple and effective.

Additionally, as another cause to which the occurrence of the separation is attributed, temperature increase in the side portions 26 in association with the rotation of the pneumatic tire at a high-speed can be pointed out. In particular, temperature increase in the side portions 26 in an inner side thereof in the tire radial direction, to each of which the bead filler 23b and the rim guard 27 are provided, is conspicuous.

Accordingly, in the present embodiment, the inner end portion arrangement distance d2 is configured to be larger by a range of 0.1 to 1 mm than the outer end portion arrangement distance d1, as described above. As can be seen from the results of the comparative assessment test (comparing Example 2 and Comparative Example 2) shown in Table 1, separation of the side reinforcement layers 100 can be effectively restrained when the inner end portion arrangement distance d2 is larger than the outer end portion arrangement distance d1 by 0.1 mm.

(Functions and Effects)

According to the pneumatic tire 10 according to the above-described present embodiment, circumferential rigidity of the pneumatic tire 10 is effectively enhanced because the side reinforcement layers 100 each composed of the first side reinforcement layer 110 and the second side reinforcement layer 120 are provided respectively in the side portions 26. For this reason, the tread portion 21 and the like of the pneumatic tire 10 are restrained from expanding outward in the tire radial direction, and high speed durability of the pneumatic tire 10 is enhanced.

Furthermore, thinning of a tread gauge of the shoulder portion of the tread portion 21 as compared to a center portion thereof can be avoided because the reinforcement layers are provided not in the tread portion 21 side but in the respective side portions 26.

Note that, as a method of enhancing circumferential rigidity, a method in which reinforcement cords are wound around in a circumferential direction of the pneumatic tire.

However, in this method, because an expansion rate of the pneumatic tire at the time of molding cannot be made larger, it is necessary to perform shaping on a shape of a green tire before vulcanization so that the shape can become the same as a shape thereof after the vulcanization. Furthermore, after the shaping has been performed on the green tire, the reinforcement cords (for example, steel cords) are wound around in the circumferential direction of the pneumatic tire.

For this reason, this method has a problem that steps and an operating time for manufacturing a pneumatic tire increase. However, the pneumatic tire 10 eliminates such a problem.

According to the pneumatic tire 10, the inclination angle θ of the reinforcement cords 110s (120s) can be set at 5 to 30 degrees. Because the inclination angle θ is set not less than 5 degrees, the generation of extreme rigidity unevenness in a vicinity of the side reinforcement layer 100, in which vicinity the side reinforcement layer 100 is not provided, can be avoided.

When it is supposed that the reinforcement cords 110s (120s) are substantially perpendicular (that is, with the inclination angle θ being set less than 5 degrees) to carcass cords (not illustrated) of the carcass layer 22, a force in association with loaded deformation concentrates on the portion where the side reinforcement layer 100 is not provided, due to the extreme rigidity unevenness between portions where the side reinforcement layer 100 is provided and it is not provided. As a result, durability of the pneumatic tire 10 is reduced oppositely.

Additionally, when the inclination angle θ is made larger than 30 degrees, the reinforcement cords 110s (120s) are faced excessively in the tire radial direction, and circumferential rigidity of the pneumatic tire 10 cannot be effectively enhanced.

According to the pneumatic tire 10, the overlapping width B can be set at 10 to 50% of the carcass height H. For this reason, a vicinity of the tire maximum-width portion, where a deformation amount in the circumferential direction is the largest, can be reliably reinforced.

According to the pneumatic tire 10, the outer end portion intersection angle α can be made at least 3 degrees larger than the inner end portion intersection angle β. When the outer end portion intersection angle α is at least 3 degrees larger than the inner end portion intersection angle β, the inclination angle θ in the radially outer end portion Et becomes closer to a state parallel to a circumferential line L1, and therefore, the circumferential rigidity of the pneumatic tire 10 is further enhanced.

According to the pneumatic tire 10, the inner end portion arrangement distance d2 can be made larger than the outer end portion arrangement distance d1 by 0.1 to 1 mm. Interlaminar shear strain (separation) occurring between the first and second side reinforcement layers 110 and 120 can be effectively restrained.

Note that, it is not preferable that the inner end portion arrangement distance d2 is made larger than the outer end portion arrangement distance d1 by more than 1 mm, because it leads to an increase in a total gauge in vicinities of the bead portions 23.

According to the pneumatic tire 10, the overlapping width B can be set at not more than 80 mm, or not more than 50 mm. Interlaminar shear strain (separation) occurring between the first and second side reinforcement layers 110 and 120 increases as the overlapping width B becomes larger. Consequently, by setting the overlapping width B at not less than 80 mm, more preferably, at not less than 50 mm, interlaminar shear strain occurring between the first and second side reinforcement layers 110 and 120 can be effectively restrained.

Other Embodiments

Although contents of the present invention have been disclosed by way of one embodiment of the present invention as has been described hereinabove, it should not be understood that any statement or any drawing composing a part of this disclosure limits the present invention. Based on this disclosure, various alternative embodiments, examples and operational techniques will be apparent to those skilled in the art.

Figure 5:
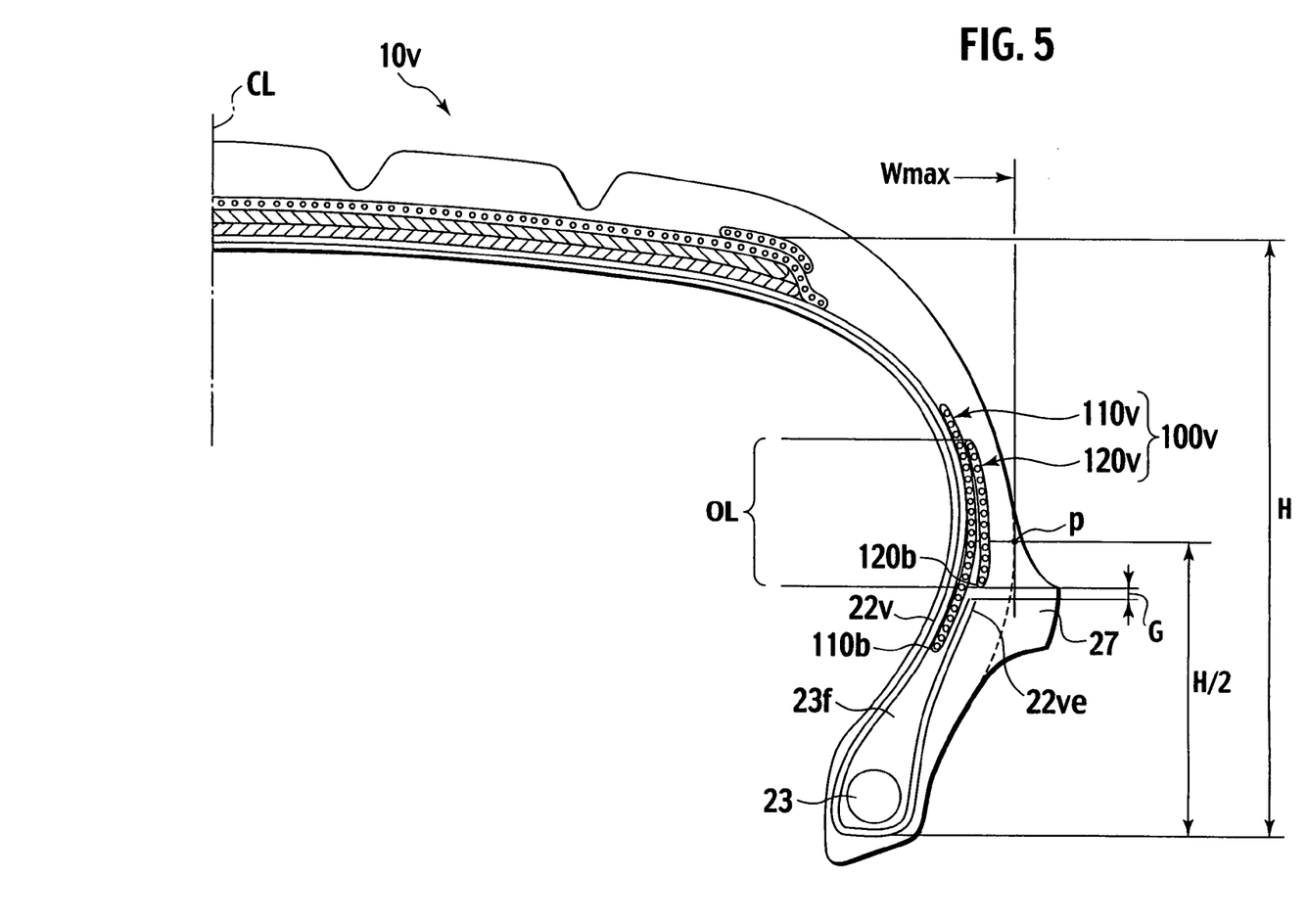
FIG. 5 is a partial cross-sectional view of a pneumatic tire according to a modification example of the present invention in the widthwise direction of the tread of the tire.

For example, the pneumatic tire according to the present invention can be modified in the following manner. FIG. 5 is a partial cross-sectional view in a tread width direction of a pneumatic tire 10v according to a modification example of the present invention. As shown in FIG. 5, side reinforcement layers 100v are provided to the pneumatic tire 10v. Each of the side reinforcement layer 100v includes the first side reinforcement layer 110v and the second side reinforcement layer 120v as in the case with the side reinforcement layers 100 provided to the above described pneumatic tire 10.

The side reinforcement layers 100v are different from the side reinforcement layers 100 provided to the above described pneumatic tire 10 in how each of the first side reinforcement layers 110v and the corresponding second side reinforcement layer 120v overlap each other, and are different in a position of each folded-back end portion 22ve of a carcass layer 22v.

Specifically, each of the folded-back end portions 22ve has a length which does not cause the folded-back end portion 22ve to overlap a lower end portion 120b which is an end portion in the tire radial direction of the second side reinforcement layer 120v. That is, a gap G is provided between the folded-back end portion 22ve and the lower end portion 120b. Moreover, each of the first side reinforcement layers 110v is longer than the corresponding second side reinforcement layer 120v, and the entirety of each of the second side reinforcement layers 120v overlaps the corresponding first side reinforcement layer 110v.

Additionally, the position of each of the folded-back end portions 22e is different, in the tire radial direction, from inner end portions in the tire radial direction (a lower end portion 110b and the lower end portion 120b) of the corresponding side reinforcement layer 100. For this reason, the occurrence of shear strain between the folded-back end portion 22e and each of the inner end portions in the tire radial direction (the lower end portion 110b and the lower end portion 120b) of the side reinforcement layer 100, and the occurrence of separation attributed to the shear strain, can be effectively restrained.

Note that, in the pneumatic tire 10 shown in FIG. 1, each of the folded-back end portions 22e may be configured to have a length which does not cause the folded-back end portion 22e to overlap the lower end portion 120b.

Moreover, although the side reinforcement layers 100 are provided in both of the side portions 26 of the pneumatic tire 10 in the above described embodiment of the present invention, the side reinforcement layer 100 may be provided in any one of the side portions 26.

Furthermore, although each of the side reinforcement layers 100 is provided outside the carcass layer 22 in the tread width direction in the above described embodiment of the present invention, the side reinforcement layer 100 may be provided inside the carcass layer 22 in the tread width direction.

Although the cap-and-layer layer 25 is provided in the pneumatic tire 10 in the above described embodiment of the present invention, the cap-and-layer layer 25 does not necessarily have to be provided therein. In addition, materials for cords composing the crossing belt layer 24 and the cap-and-layer layer 25 are not limited to those described above.

Although the first and second side reinforcement layers 110 and 120 are formed by rubberizing reinforcement cords (the reinforcement cords 110s and the reinforcement cords 120s), the first and second side reinforcement layers 110 and 120 do not necessarily have to be formed by rubberizing reinforcement cords.

Additionally, although the pneumatic tire 10 is a pneumatic tire (having a tire size of 215/45R17) for a general passenger car, the present invention is not limited to a pneumatic tire for a general passenger car, and needless to say, can be applied to a pneumatic tire for a race (a motor sport).

As described above, it goes without saying that the present invention includes various embodiments and the like which are not herein described. Accordingly, a technical scope of the present invention should be defined by inventive specifications according to the scope of clams, the inventive specifications being appropriate based on the above descriptions.

INDUSTRIAL APPLICABILITY

As has been described above, the pneumatic tire according to the present invention is advantageous in a technique and the like of manufacturing a pneumatic tire because high speed durability thereof can be further enhanced in without reducing a wear life of the shoulder portion.

The invention claimed is:

1. A pneumatic tire provided with a side reinforcement layer in a side portion, wherein:
   the side reinforcement layer comprises:
   a first side reinforcement layer; and
   a second side reinforcement layer, which includes an overlapping region overlapping the first side reinforcement layer in at least a part of a maximum-width portion of the pneumatic tire in a tread width direction, and which is provided outside the first side reinforcement layer in the tread width direction;

the first side reinforcement layer includes a plurality of first linear members;

the second side reinforcement layer includes a plurality of second linear members each crossing the first linear members; and an inclination angle of each of the first and second linear members with respect to a circumferential line extending in a circumferential direction of the pneumatic tire is 5 to 30 degrees, wherein an outer end portion intersection angle ($\alpha$) is at least 3 degrees larger than an inner end portion intersection angle ($\beta$), the outer end portion intersection angle ($\alpha$) being an intersection angle on an outer side in the tire radial direction formed by each of the first linear members and each of the second linear members, in an outer end portion of the overlapping region in the tire radial direction, and the inner end portion intersection angle ($\beta$) being an intersection angle on an inner side in the tire radial direction formed by each of the first linear members and each of the second linear members, in an inner end portion of the overlapping region in the tire radial direction.

2. The pneumatic tire according to claim 1, wherein the inclination angle is 5 to 20 degrees.

3. The pneumatic tire according to claim 1, wherein an overlapping width which is a width of the overlapping region in a tire radial direction is equal to 10% to 50% of a carcass height which is a height from a corresponding bead portion of the pneumatic tire to an outermost end in the tire radial direction of a carcass layer.

4. The pneumatic tire according to claim 3, wherein the overlapping width is equal to 10% to 30% of the carcass height.

5. The pneumatic tire according to claim 1, wherein a folded-back end portion of the carcass layer has a length which does not cause the folded-back end portion to overlap an inner end portion of the second side reinforcement layer in the tire radial direction, the folded-back end portion being formed by folding back the carcass layer around a bead portion.

6. The pneumatic tire according to claim 1, wherein in the tire radial direction, a position of the folded-back end portion of the carcass layer of the pneumatic tire is different from the inner end portions in the tire radial direction, respectively, of the first and second side reinforcement layers, the folded-back end portion being formed by folding back the carcass layer around a bead portion of the pneumatic tire.

7. The pneumatic tire according to claim 1, wherein an overlapping width which is the width of the overlapping region in the tire radial direction is not more than 80 mm.

8. The pneumatic tire according to claim 1, wherein any one of the first linear members and the second linear members are formed of any one of steel monofilaments and steel cords.

9. The pneumatic tire according to claim 1, wherein any one of the first linear members and the second linear members are formed of predetermined highly elastic organic fiber cords.

10. A pneumatic tire provided with a side reinforcement layer in a side portion, wherein:

the side reinforcement layer comprises:

a first side reinforcement layer; and a second side reinforcement layer, which includes an overlapping region overlapping the first side reinforcement layer in at least a part of a maximum-width portion of the pneumatic tire in a tread width direction, and which is provided outside the first side reinforcement layer in the tread width direction;

the first side reinforcement layer includes a plurality of first linear members;

the second side reinforcement layer includes a plurality of second linear members each crossing the first linear members; and an inclination angle of each of the first and second linear members with respect to a circumferential line extending in a circumferential direction of the pneumatic tire is 5 to 30 degrees, wherein an inner end portion arrangement distance (d2) is larger than an outer end portion arrangement distance (d1), the inner end portion arrangement distance (d2) being an arrangement distance in the tread width direction between each of the first linear members and each of the second linear members, in the inner end portion of the overlapping region in the tire radial direction, and the outer end portion arrangement distance (d1) being an arrangement distance in the tread width direction between each of the first linear members and each of the second linear members, in the outer end portion of the overlapping region in the tire radial direction.

11. The pneumatic tire according to claim 10, wherein the inner end portion arrangement distance (d2) is larger than the outer end portion arrangement distance (d1) by 0.1 to 1mm.

12. The pneumatic tire according to claim 10, wherein the inclination angle is 5 to 20 degrees.

13. The pneumatic tire according to claim 10, wherein an overlapping width which is a width of the overlapping region in a tire radial direction is equal to 10% to 50% of a carcass height which is a height from a corresponding bead portion of the pneumatic tire to an outermost end in the tire radial direction of a carcass layer.

14. The pneumatic tire according to claim 13, wherein the overlapping width is equal to 10% to 30% of the carcass height.

15. The pneumatic tire according to claim 10, wherein a folded-back end portion of the carcass layer has a length which does not cause the folded-back end portion to overlap an inner end portion of the second side reinforcement layer in the tire radial direction, the folded-back end portion being formed by folding back the carcass layer around a bead portion.

16. The pneumatic tire according to claim 10, wherein in the tire radial direction, a position of the folded-back end portion of the carcass layer of the pneumatic tire is different from the inner end portions in the tire radial direction, respectively, of the first and second side reinforcement layers, the folded-back end portion being formed by folding back the carcass layer around a bead portion of the pneumatic tire.

17. The pneumatic tire according to claim 10, wherein an overlapping width which is the width of the overlapping region in the tire radial direction is not more than 80 mm.

18. The pneumatic tire according to claim 10, wherein any one of the first linear members and the second linear members are formed of any one of steel monofilaments and steel cords.

19. The pneumatic tire according to claim 10, wherein any one of the first linear members and the second linear members are formed of predetermined highly elastic organic fiber cords.

* * * * *